Feb. 12, 1924.
A. KATZINGER
1,483,637
PEELING MECHANISM
Filed May 24, 1919   7 Sheets-Sheet 1
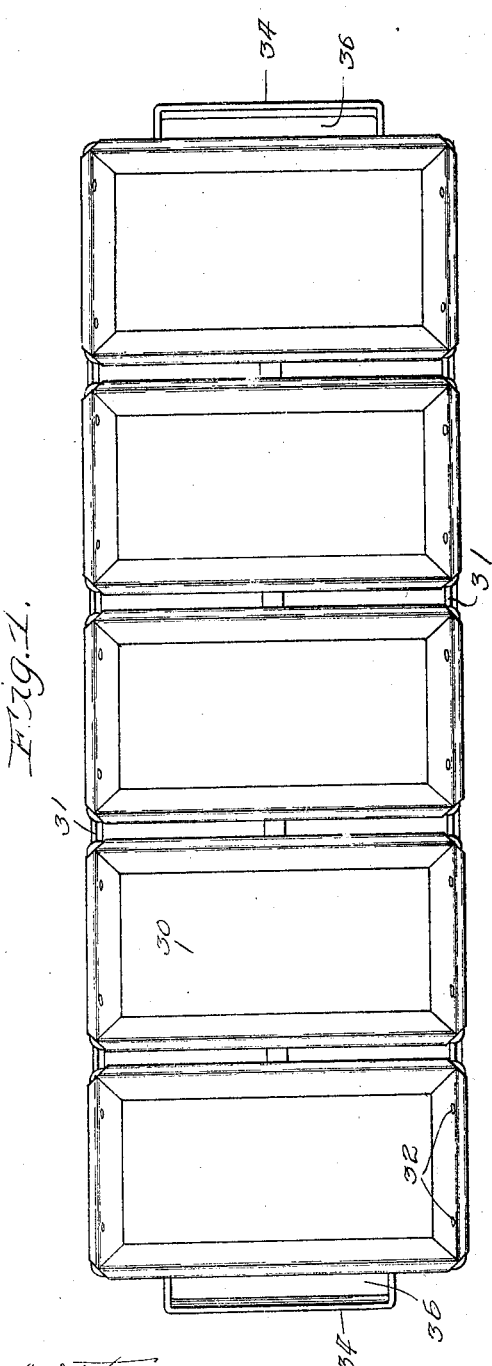
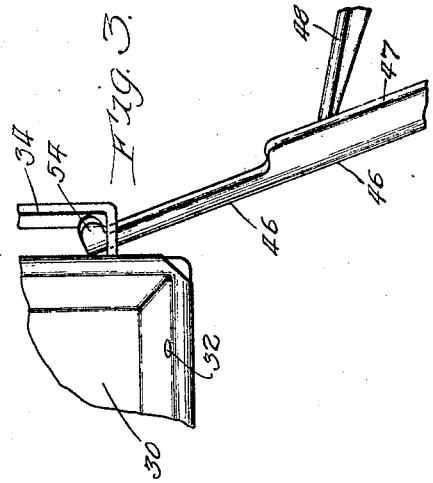
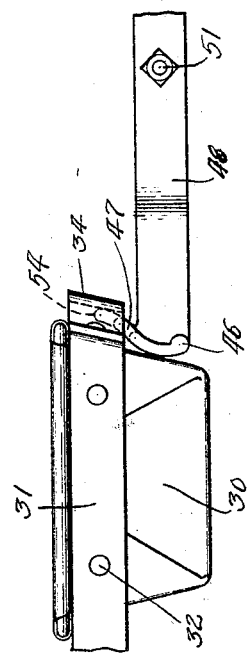
Witness:
R. L. Darrington
Inventor,
Arthur Katzinger
By Brown & Niesen Attys Feb. 12, 1924.

A. KATZINGER

PEELING MECHANISM

Filed May 24, 1919  7 Sheets-Sheet 2

Witness:
R. L. Farrington

Inventor,
Arthur Katzinger
By Brown & Nissen Attys.

Feb. 12, 1924.
A. KATZINGER
PEELING MECHANISM
Filed May 24, 1919
1,483,637
7 Sheets-Sheet 3

Witness:
R. L. Turrington

Inventor,
Arthur Katzinger
By Brown & Nissen Attys.

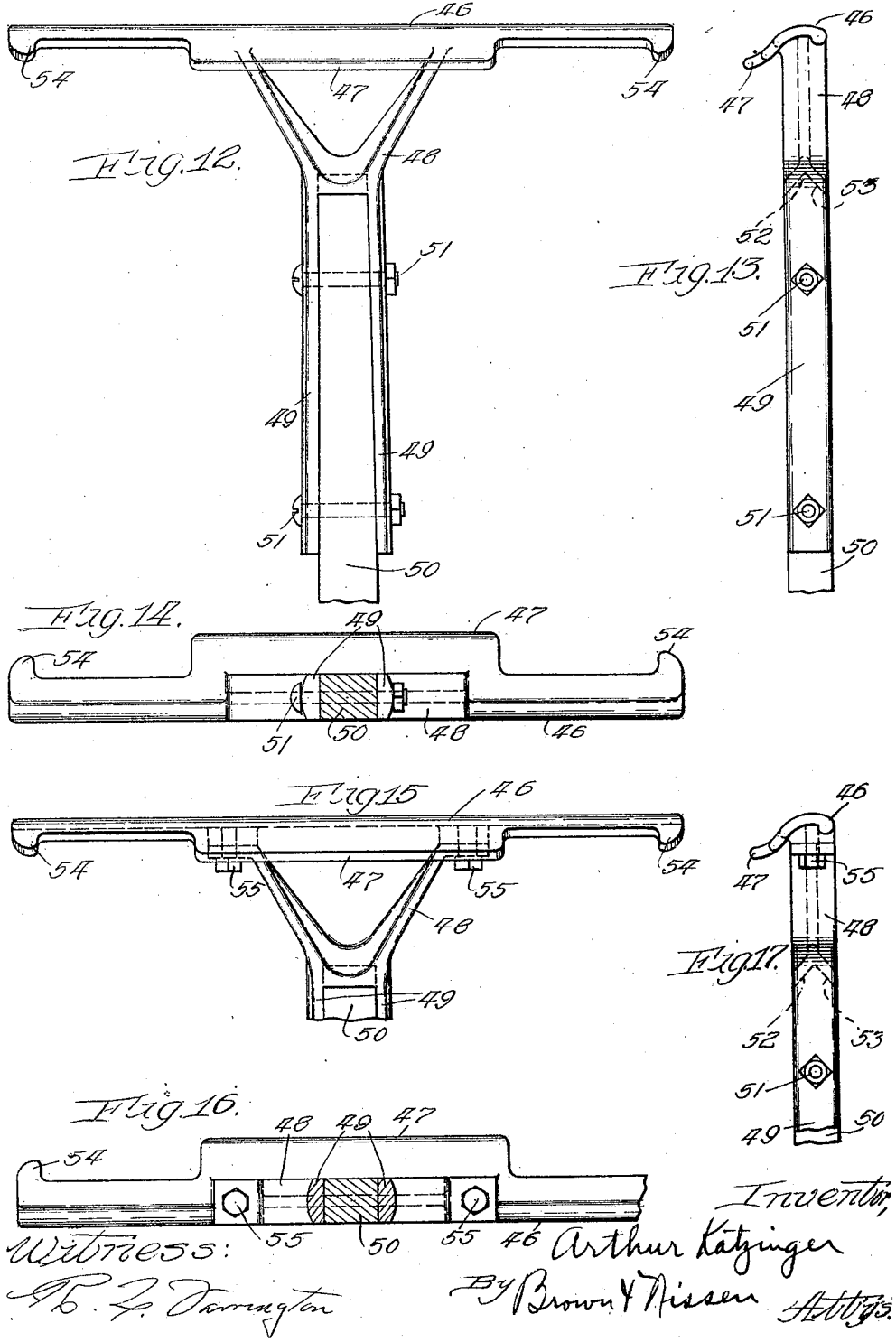

Feb. 12, 1924.
A. KATZINGER
PEELING MECHANISM
Filed May 24, 1919  7 Sheets-Sheet 5
1,483,637
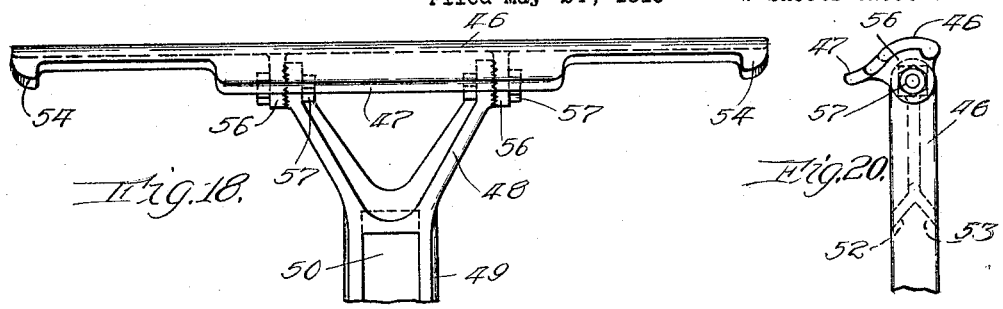
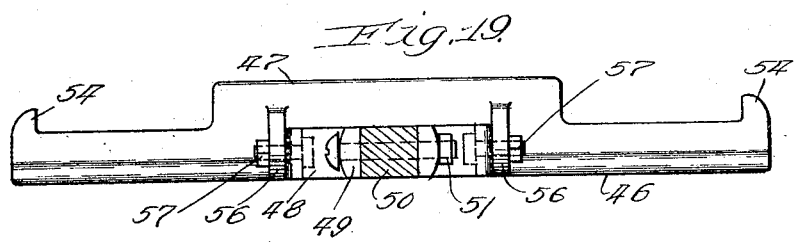
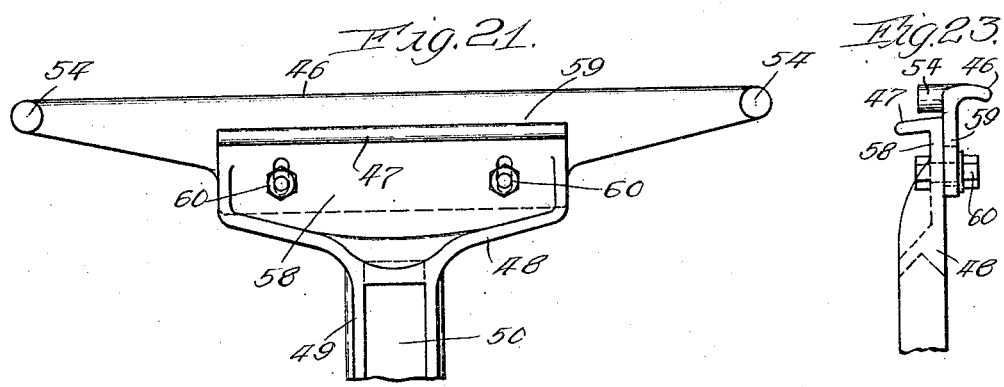
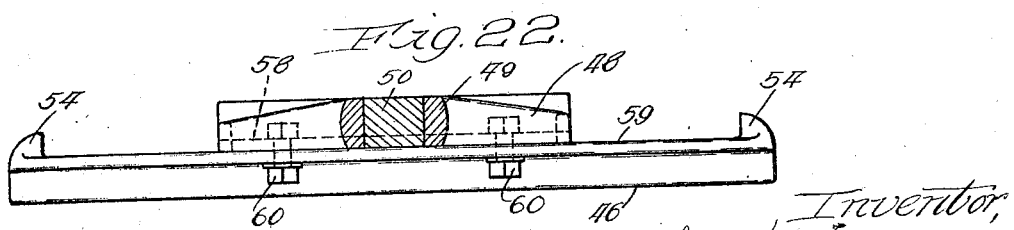
Witness:
R. L. Farrington
Inventor,
Arthur Katzinger
By Brown & Nissen Attys

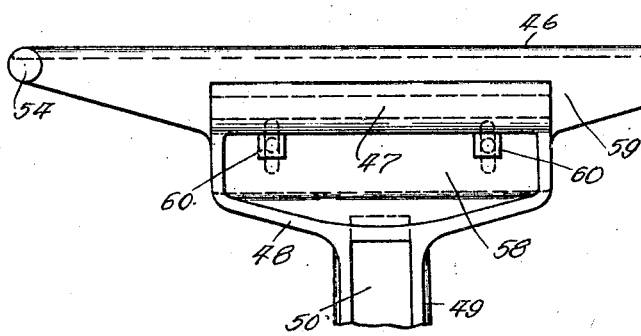
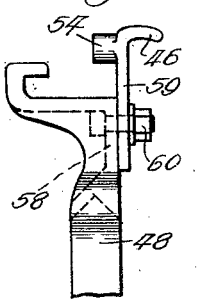
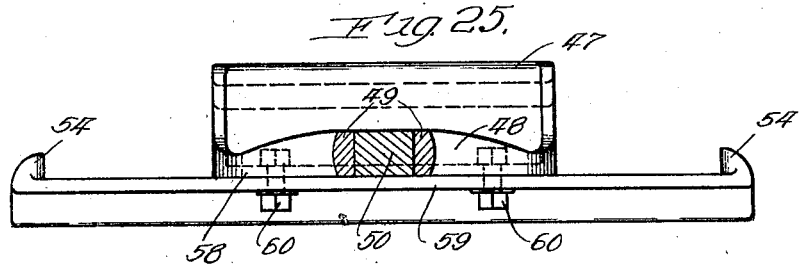
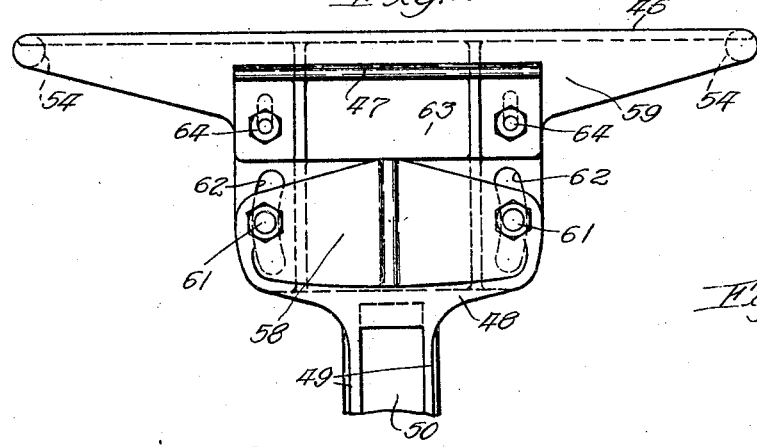
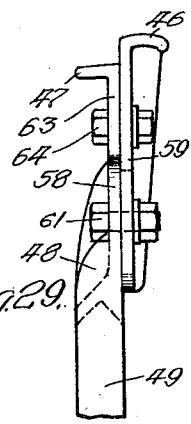
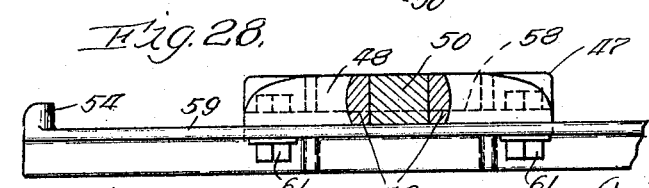

Feb. 12, 1924.
A. KATZINGER
PEELING MECHANISM
Filed May 24, 1919   7 Sheets-Sheet 7
1,483,637
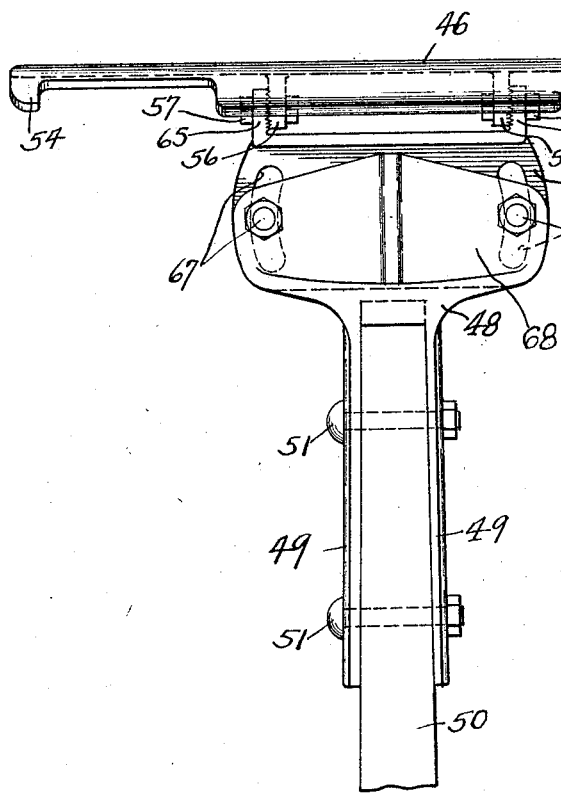
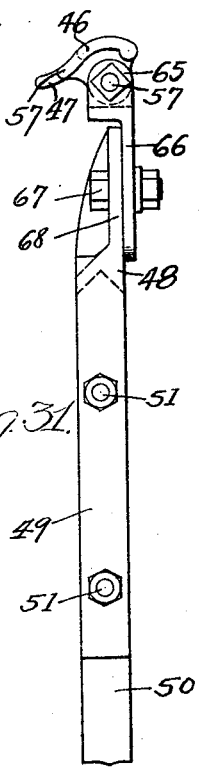
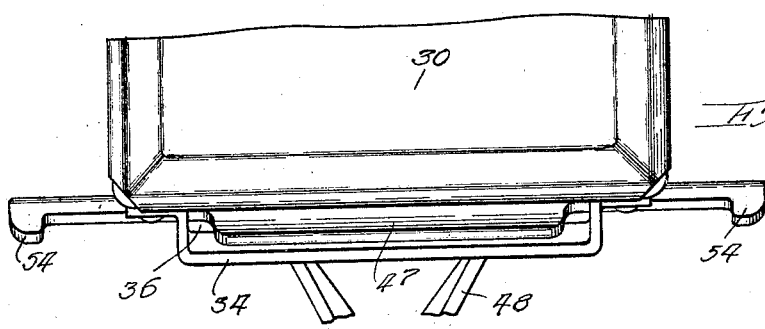
Inventor,
Arthur Katzinger
By Brown & Nissen Attys Patented Feb. 12, 1924.

1,483,637

UNITED STATES PATENT OFFICE.

ARTHUR KATZINGER, OF CHICAGO, ILLINOIS, ASSIGNOR TO EDWARD KATZINGER COMPANY, OF CHICAGO, ILLINOIS, A CORPORATION OF ILLINOIS.

PEELING MECHANISM.

Application filed May 24, 1919. Serial No. 299,614.

*To all whom it may concern:*

Be it known that I, ARTHUR KATZINGER, a citizen of the United States, residing at Chicago, in the county of Cook and State of Illinois, have invented certain new and useful Improvements in Peeling Mechanism, of which the following is a specification.

My invention relates to peeling mechanism, and has for one of its objects the provision of a bake pan set having suitable handles, or the like, with a peeling member adapted to engage a handle of the pan set for moving such pans in and out of the oven.

A further object is the provision of a bake pan set having a handle, or the like, with a peeling member having a hook thereon for moving a pan set into position for lifting engagement by the peel member.

A further object is the provision of a peel member having adjustments therein for engaging pans of various sizes and shapes.

A still further object is the provision of a simple and efficient device of the character mentioned which is economical of manufacture and capable of use for a long period of time.

Other objects will appear hereinafter.

An embodiment of my invention is illustrated in the accompanying drawings, forming a part of this specification, and in which—

Fig. 1 is a plan view of a set of bakers' pans equipped with a handle or peel-engaging member embodying my invention.

Fig. 2 is a fragmental side elevation of a set of baking pans and peel member in lifting engagement with the pans.

Fig. 3 is a fragmental view showing the peel member engaging the handle part of a set of pans in a manner to move the latter without lifting them.

Fig. 4 is an enlarged fragmental view of a set of pans having one type of handle.

Fig. 5 is a side view of the same.

Fig. 6 is a fragmental side view of a baking pan having a modified form of handle.

Fig. 7 is an end view of the construction shown in Fig. 6.

Fig. 12 is a plan view of one form of a peel member used in the construction.

Fig. 13 is a side view of the same.

Fig. 14 is a handle end view of the same.

Fig. 15 is a view similar to Fig. 12, except showing a modified form.

Fig. 16 is a handle end view of the same.

Fig. 17 is a side view of the construction shown in Fig. 15.

Fig. 18 is a fragmental plan view of another modified form of peel member.

Fig. 19 is a handle end view of the same.

Fig. 20 is a fragmental side elevation.

Fig. 21 is a fragmental plan view of another form of peel member.

Fig. 22 is a handle end view of the same.

Fig. 23 is a side view of the same.

Fig. 24 is a fragmental plan view of another form of peel member.

Fig. 25 is a handle end view of the same.

Fig. 26 is a side view of the same.

Fig. 27 is another modified form of the peel member.

Fig. 28 is a fragmental handle end view of the same.

Fig. 29 is a side view of the same.

Fig. 30 is a plan view of another form of peel member.

Fig. 31 is a side view of the same; and

Fig. 32 is a fragmental plan view showing the peel member engaging a handle portion of a pan set.

Figure 8:
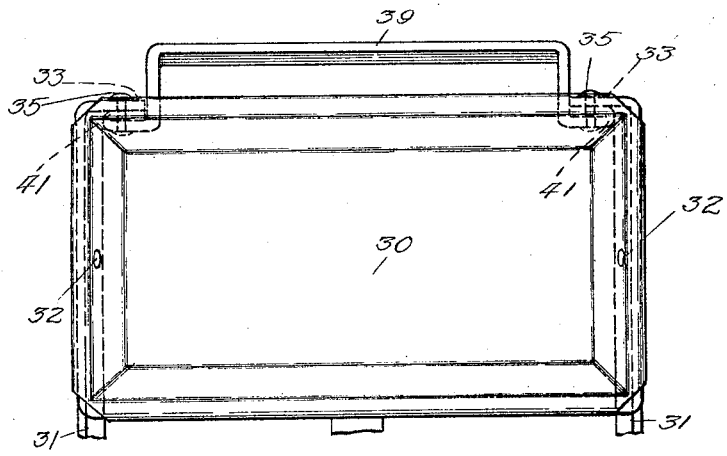
Fig. 8 is a fragmental plan view of a set of pans having another form of handle member.

My invention is particularly adaptable for embodiment in bake pan sets and peel members for handling said pan sets. In practice previous to now bake pan sets were handled by sliding a wooden peel blade under them, then lifting the peel blade. My invention embodies providing a handle or loop member, or other means on the pan set to be engaged by a suitable peel member for lifting the pans.

In my present embodiment I have indicated the handle members as being on the ends of the sets and spaced slightly from the latter so as to provide a space for a hook portion of the peel member to pass into. This loop or handle portion is preferably secured to the frame holding the pans in the set. It will be apparent, however, that the embodiments shown may be modified in accordance with the claims hereunto annexed.

In Fig. 4 I have indicated a set of pans comprising individual pans 30 joined along their ends by straps 31. The straps may be secured to the pans 30 in any desirable manner, such as by the rivets 32. The ends of the straps 31 are preferably bent over onto the outer sides of the end pans 30, as at 33 in Fig. 4. To these ends 33 are preferably secured the ends of a handle member 34. The member 34 may be secured to the ends 33 in any desirable manner, such as by the rivets 35; see Fig. 5. This form of handle 34 may be made of a single piece of flat strap iron, bent as indicated in Figs. 4 and 5, providing a space 36 between the middle part of member 34 and the outer side of the end pan 30.

A disadvantageous feature in ordinary bake pan construction is that a plate 37' indicated in dotted lines in Fig. 5 must be placed on the pan over the outer side 37 of the outer pan to protect this outer side against the use of the old-fashioned wooden peel, not shown. In operating the old-fashioned wooden peel, the operator jabs the peel at the pan set and often hits the side of the pan, which would damage the pan if it were not protected by the plate 37'. These plates tend to prevent the heat of the oven from radiating to the side of the loaf in the pan adjacent the sides 37, causing the loaves to bake unevenly. My construction does away with this plate entirely and permits the heat to engage the sides 37 of the pans equally with the other sides, thereby insuring even baking of the loaves on all sides.

In Figs. 6 and 7 I have shown the pans 30 as being connected together by straps 31 and rivets 32, the same as the pans indicated in Fig. 4. The straps also have the ends 33 bent around on the outer side 37 of the pan shown in Figs. 6 and 7. The handle member 38 is shown as having its central portion round and having its end portions flattened and secured to the ends 33 by the rivets 35. This form of handle may be made of cast material, or in any other desirable manner.

Figure 9:
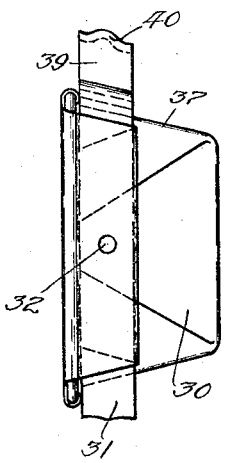
Fig. 9 is a side view of the construction shown in Fig. 8.

In Figs. 8 and 9 the pans 30 are connected in a manner similar to that shown in Fig. 4 by straps 31 and rivets 32, with the ends 33 of the straps bent around on the side 37 of the pan shown. The handle member 39 shown in these last-mentioned figures is preferably made of a flat band with its central portion beaded, as at 40, to strengthen it. Also, as a means of better securing it to the ends 33, the ends 41 are bent back upon themselves, and these bent portions secured to the ends 33 by rivets 35.

Figure 10:
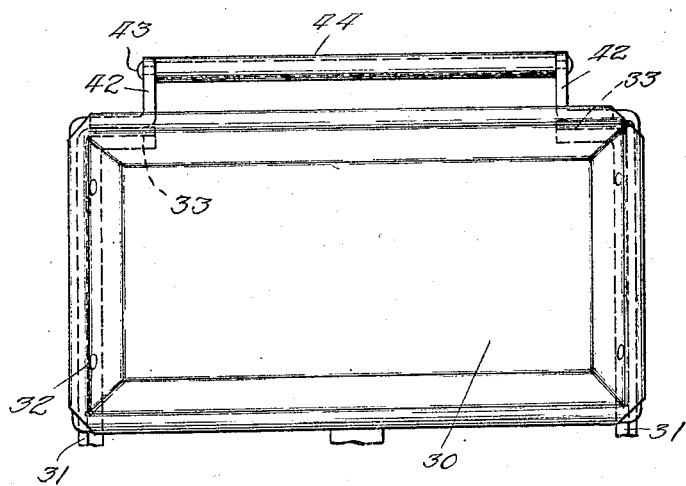
Fig. 10 is a fragmental plan view of a set of pans having still another form of handle.
Figure 11:
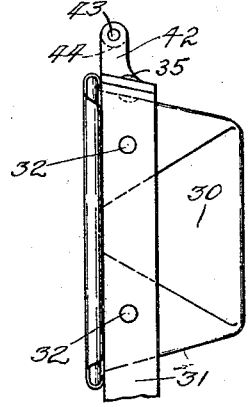
Fig. 11 is a side view of the construction shown in Fig. 10.

In Figs. 10 and 11 the pans 30 are secured together by straps 31 and rivets 32, as indicated in Fig. 4. In this form small L-shaped members 42 are secured to the bent-over ends 33 by rivets 35, and the outstanding ends of the members 42 secured together by a long rivet 43. Rotatably mounted on the rivet 43, between the parallel parts of members 42, is a roller 44. From the different forms of handle members indicated it will be apparent that many other forms will be suggested by one skilled in the art and which will come within the scope of the appended claims.

In Figs. 12, 13 and 14 I have indicated one form of peel member adapted to cooperate with any of the pan handle members hereinbefore referred to. In this form of peel member I have indicated an elongated member 46 which is adapted to engage the entire length of the side 37 of the pan, as indicated in Fig. 32. Cooperating with the part 46 is a hook member 47 which is adapted to pass into the space 36 and engage the inner side of any of the forms of handle members before referred to. In the form shown in Figs. 12, 13 and 14 the members 46—47 and the handle portion 48 are formed integrally. The member 48 is preferably bifurcated having prongs 49 between which a handle 50 of wood, or other similar material is secured by bolts 51, or their equivalent. The handle 50 may be provided with a wedge-shaped end 52 when so desired cooperating with a V-shaped portion 53 of the part 48 to facilitate a joint between the parts 48 and 50. In use when the pan hook 47 engages one of the pan handles shown, the part 46 is adapted to engage the side 37 of the pan over the entire length thereof so that the set of pans can be raised.

The hook 47 is preferably provided somewhat long so as to have more bearing surface. Since the space 36 is comparatively narrow it might be difficult to engage the hook 47 in said space in some relative positions of the peel member and pan sets. In order to bring the pan set into a suitable position to be engaged by the hook 47, I provide auxiliary hooks 54, preferably one at each end of the member 46, which may be brought into engagement with a pan handle in order to drag or otherwise move the pan set about until the pan handle is brought into position for the hook 47 to engage the space 36; see Fig. 3.

In Figs. 15, 16 and 17 a modification is made in the peel member in that the members 46, 47 and 54 are formed in one integral part, and the member 48 secured thereto by cap screws 55, or their equivalent. This permits reversing the member 46—47—54 on the part 48 if desirable, or one part may be renewed without renewing both.

In Figs. 18, 19 and 20 I have indicated another modification of the peel member. In this form the parts 46, 47 and 54 are formed in one integral part with ears 56 thereon engaging suitable portions or ears on the part 48. The ears on part 48 are pivoted to the ears 56 by bolts 57, or their equivalent, so that the members 46 and 47 may be varied with respect to the handle member 48 so as to engage sides 37 of pan sets having different angularity, or where the individual pans 30 have different flares. Furthermore, with some of the handle forms shown the spaces 36 may be varied. By setting the member 46—47—54 and tightening the bolts 57, these different conditions may be met.

In Figs. 21, 22 and 23 I have indicated another modified form of peel member in which the member 48 is provided with a flat portion 58 and having the hook 47 formed integral with its outer edge. Disposed on the flat portion 58 is a flat plate 59 carrying the pan-engaging member 46. Spaced-apart slot and bolt connections 60, 60 are provided between the parts 58 and 59 so that the part 46—59 may be moved back and forth on the part 58 and held in different positions to accommodate spaces 36 of different widths between the pan handle and adjacent pan side, or different angularity of the pan sides 37. In this form the auxiliary hooks 54 are preferably formed on the ends of the member 46, as indicated.

In Figs. 24, 25 and 26 a still different form of peel mechanism is indicated. In this form the member 48 is provided with the flat portion indicated in the previous form. The pan-engaging member 46 is also provided with a flat portion 59, which is connected with the part 58 by spaced-apart slot and bolt connections 60, 60 so that the part 46—59 may be moved back and forth on the part 58 as in the previously indicated form.

In the form shown in Figs. 24, 25 and 26 the pan handle engaging hook 47 is extended from the part 58 with its point directed in the opposite direction to that indicated in the previously mentioned figures. In engaging the hook 47 with the handle in the figures indicated previous to Fig. 24, the hook is moved under and upwardly into engagement with the pan handle. In the form shown in Figs. 24, 25 and 26 the hook member is moved over the pan handle and dropped downwardly into hooking engagement with said pan handle. In this form, as well as the previously mentioned forms, the hook 47 and part 46 cooperate in engaging the pan set to raise the latter.

In Figs. 27, 28 and 29 I have shown another form of peeling mechanism. In this form the part 48 is provided with the flat portion 58, and the pan-engaging part 46 is provided with a flat portion 59 engaging the part 58. In this form two bolts 61 are provided which pass through arcuate slots 62, so that by loosening the bolts 61, the part 46—59 can be swung to vary the angularity of the pan-engaging member 46 with the handle member 48. This will be clearly apparent form Fig. 27. The bolts 61, of course, may be tightened to hold the member 46 in any of its desired angular positions with respect to the handle.

In the last form mentioned, the hook member 47 is provided with a flat portion 63 which rests against the flat part 59 and connected therewith by spaced-apart slot and bolt connections 64, 64 so that the pan hook 47 may be adjusted back and forth on the member 59 to vary its relation with the member 46 to accommodate different widths of spaces 36, or different angularities of the pan sides 37. The bolt and slot connections 64, 64 will effectively hold the member 47 in any of its desired positions. This form is also provided with the auxiliary hooks 54.

In Figs. 30 and 31 I have indicated another form of peeling mechanism. In this form the pan-engaging part 46, hook member 47, hooks 54 and ears 56 are formed in one integral part, substantially the same as in the form shown in Fig. 18. The ears 56 are pivoted to ears 65 by bolts 57, or their equivalent. The ears 65 and flat part 66 are formed in one integral part, and the member 66 is connected by means of a slot and bolt connection 67, 67 to a flat part 68 which is formed integrally with the handle part 48. The adjacent sides of the ears 56 and 65 are preferably roughened or formed with teeth, as indicated in both Figs. 18 and 30, so that the bolts 57 will hold the part 46—47—54—56 in a fixed position relative to the handle when once set. It will be apparent, however, that the roughened surfaces are not absolutely necessary, but may be formed in any way desirable.

In all forms of the peeling member or mechanism, the pan-engaging part 46 is indicated disposed substantially perpendicular to the center line of the handle 50, but it will be apparent that in any of these forms the angularity of the part 46 and 50 may be varied. In the form shown in Figs. 27 and 30 means are shown for setting the part 46 at different angles with the handle, but in the other forms a fixed angle must be provided for when the peeling member is made. It will be desirable to set the part 46 at an angle to the handle so that the greatest number of pans in a particular oven can be reached. For instance, if the door of an oven is near one side of the latter, the part 46 could be set at an angle to engage a number of the pans, or where the oven is quite wide, more than one peel member may be utilized with the parts 46 set at different angles to the handle 50.

The form of peel member indicated in Figs. 24, 25 and 26 is particularly useful in handling pan sets where the pans are very shallow and where there is not sufficient room under the peel-engaging handle of the pan for the member 47 to pass under it easily. Also, some operators prefer to have the hook 47 turned in the direction indicated in these figures.

The handle members indicated at the ends of the pan for engaging the peel member have the function, not only of being peel-engaging members, but serve for manually handling the pan sets. In removing material from pan sets now in use, the operator ordinarily uses a sack or other cloth to handle the hot pan set and oftentimes his hand reaches over onto the tops of the loaves in the pans, hindering the easy removal of the loaves from such pans. In this device the operator handles the pan sets by the handles which extend away from the pans sufficiently far to permit the loaves to be dumped out of the pans easily and without the operator's hand or cloth touching the loaves. These handles not only have the functions of being peel-engaging members and handles for manually handling the pan sets, but serve as a means for preventing different pan sets from being placed so close together as to prevent heat from passing up between the adjacent ends of such pan sets, thereby insuring even baking of all the loaves in all of the sets.

In Fig. 32 I have shown a plan view of a fragment of a pan set and peel-engaging member engaging the handle of the pan set. The part 46 is preferably formed in a length so that it extends beyond the ends of the individual pans 30, as indicated in this figure. However, the distance beyond the ends of the pans 30 which the part 46 extends is immaterial. The advantage of the extension of the part 46 beyond the ends of the pan is that by extending beyond the ends 75 of such pans 30, these ends serve as stiffening means against which the part 46 presses in raising the pans. If the part 46 is shorter than the side 37 of the pan set, the tendency is to dent in this side 37, and also the loaf in such pan.

I claim:—

1. Peeling mechanism comprising a handle, and a pan-lifting member adjustably mounted on the handle.

2. Peeling mechanism comprising a pan-engaging member; a pan hook member; and means adjustably connecting the pan-engaging member with the pan hook member.

3. Peeling mechanism comprising a pan-engaging member; a pan hook; and means attaching the aforesaid parts together and permitting relative adjustment of the pan-engaging member and pan hook.

4. Peeling mechanism comprising a handle; a pan hook attached to the handle; and a pan-engaging member adjustably connected with the handle.

5. Peeling mechanism comprising a handle, a pan-engaging member pivotally mounted on the handle; and a pan hook attached to the pan-engaging member.

6. Peeling mechanism comprising a handle; a pan-engaging member; a pan hook attached to the pan-engaging member; and a slot and pin connection between the handle and pan-engaging member.

7. Peeling mechanism comprising a handle; a pan-engaging member carried by the handle and mounted for adjustment relative thereto; and a pan hook adjustable relatively to the pan-engaging member and handle.

8. Peeling mechanism comprising a handle; a pan-engaging member mounted on and adjustable angularly to the handle; and a pan hook attached to the pan-engaging member.

9. Peeling mechanism comprising a handle; a pan-engaging member; a pan hook; a connection between the pan hook and pan-engaging member permitting relative adjustments thereof; and means connecting said connection with the handle permitting relative angular adjustment of the pan hook and pan-engaging member with the handle.

10. Peeling mechanism comprising a handle; a pan-engaging member and a pan hook attached together; and means connecting the handle with the pan-engaging member and pan hook for angular adjustments.

11. Peeling mechanism comprising handles connected to the ends of a rectangularly arranged bake pan set forming a rigid structure, said handles being provided with rectilinearly arranged recesses for receiving peel mechanism to move said bake pan set about in an oven.

12. Peeling mechanism comprising a handle, a rectilinear device attached to one end of said handle and adapted to engage the flat surface of a baking pan above the lower edge thereof, and hook mechanism rectilinearly arranged above the rectilinear pan-engaging device to cooperate with the latter and additional connection to the pan for lifting the latter.

13. Peeling mechanism comprising a rectangularly arranged bake pan set composed of a plurality of pans rigidly connected together, projections extending from the ends of the bake pan set and having rectilinearly arranged recesses, a peel handle, and rectilinear hook mechanism adapted to engage the ends of the bake pan set and said recesses to lift the bake pan set into or out of an oven.

14. Peeling mechanism comprising a handle, a pan-engaging member mounted on and adjustable angularly to the handle on a transverse axis, and a pan hook attached to said pan-engaging member.

15. Peeling mechanism comprising a handle, a pan-engaging member mounted on and adjustable angularly to the handle on an upright axis transversely of the handle and transversely of said pan-engaging member, and a pan hook attached to said pan-engaging member.

16. Peeling mechanism comprising a handle and a rectilinear pan-engaging device, a rectilinear hook connected to said pan-engaging device, a carrier connected to one end of said handle, an adjuster, spaced-apart pin and slot connections between said carrier and said adjuster, means for securing said adjuster to said carrier in adjusted angular positions, and spaced apart securing mechanism for holding said rectilinear pan-engaging device and said hook in adjusted positions relative to said adjuster on an axis extending longitudinally of said pan-engaging device.

17. Peeling mechanism comprising a rectilinear pan-engaging device, hook mechanism connected to said pan-engaging device and distributed rectilinearly, an additional hook connected to one end of said pan-engaging device, and a handle connected to said pan-engaging device.

18. Peeling mechanism comprising a rectilinear pan-engaging device, hooks at the ends of said pan-engaging device adapted to engage a slotted projection extending from one end of a bake pan to shift the bake pan to one side or the other in an oven, hook mechanism connected to said pan-engaging device and distributed rectilinearly in position to engage such projection extending from the bake pan for lifting the latter into and out of the oven, and a handle connected to said pan-engaging device for operating the said hooks and hook mechanism to shift the bake pan and lift the same.

In testimony whereof I have signed my name to this specification on this 21st day of May, A. D. 1919.

ARTHUR KATZINGER.